(12) United States Patent
Nannoni et al.

(10) Patent No.: US 8,567,717 B2
(45) Date of Patent: Oct. 29, 2013

(54) AIRCRAFT LANDING GEAR

(75) Inventors: Fabio Nannoni, Novara (IT); Dante Ballerio, Caronno Varesino (IT)

(73) Assignee: Agusta S.p.A., Samarate (IT)

( * ) Notice: Subject to any disclaimer, the term of this patent is extended or adjusted under 35 U.S.C. 154(b) by 426 days.

(21) Appl. No.: 12/938,986

(22) Filed: Nov. 3, 2010

(65) Prior Publication Data

US 2011/0147518 A1   Jun. 23, 2011

(30) Foreign Application Priority Data

Nov. 4, 2009 (EP) ................................. 09425441

(51) Int. Cl.
*B64C 25/10* (2006.01)
*B64C 25/24* (2006.01)

(52) U.S. Cl.
USPC ................. 244/102 R; 244/10 R; 244/102 A; 244/103 R

(58) Field of Classification Search
USPC ................... 244/100 R, 102 R, 102 A, 103 R
See application file for complete search history.

(56) References Cited

U.S. PATENT DOCUMENTS

| | | | | |
|---|---|---|---|---|
| 1,951,817 A * | 3/1934 | Blount | ......................... | 244/7 R |
| 2,333,132 A * | 11/1943 | Waseige | ..................... | 244/102 R |
| 2,371,699 A * | 3/1945 | Martin | ....................... | 244/102 A |
| 2,387,713 A * | 10/1945 | Bradford | .................. | 244/102 R |
| 2,399,218 A * | 4/1946 | Felburg | ...................... | 244/102 R |
| 2,486,242 A * | 10/1949 | Ashton | ...................... | 244/102 R |
| 2,550,028 A * | 4/1951 | Wells | ......................... | 244/102 R |
| 2,719,016 A * | 9/1955 | Wicks | ........................ | 244/102 R |
| 3,904,153 A * | 9/1975 | Watts | ....................... | 244/102 SL |
| 4,355,773 A * | 10/1982 | Masclet et al. | ............ | 244/102 R |
| 4,556,179 A * | 12/1985 | Veaux et al. | ............... | 244/102 R |
| 4,630,788 A * | 12/1986 | Veaux et al. | ............... | 244/102 A |
| 4,984,755 A * | 1/1991 | Derrien | ..................... | 244/102 A |
| 4,995,574 A * | 2/1991 | Bernard et al. | ............ | 244/102 R |
| 5,209,431 A * | 5/1993 | Bernard et al. | ........... | 244/100 R |
| 5,337,976 A * | 8/1994 | Derrien | ..................... | 244/102 A |
| 6,666,407 B2 * | 12/2003 | Pancotti | .................... | 244/102 R |
| 6,942,182 B2 * | 9/2005 | Quayle | ...................... | 244/102 R |
| 7,051,977 B2 * | 5/2006 | Yoshioka | .................. | 244/103 R |

(Continued)

FOREIGN PATENT DOCUMENTS

EP   2107273 A2   10/2009
FR   2464883 A1   3/1981

OTHER PUBLICATIONS

European Search Report for Application No. EP09425441, dated Mar. 9, 2010, 2 pages.

*Primary Examiner* — Michael Carone
*Assistant Examiner* — Steven Hawk
(74) *Attorney, Agent, or Firm* — McCracken & Frank LLC

(57) ABSTRACT

A landing gear for an aircraft, having mounting means fitted to the fuselage of the aircraft; at least one wheel; and at least one supporting arm having a first end portion connected to the mounting means, and a second end portion opposite the first end portion, and to which the wheel is suspended. The first end portion of the supporting arm has a seating portion fitted in rotary manner to a pin connected to the mounting means and extending crosswise to the supporting arm; and an electrically controlled actuator is fitted to the seating portion, and is activated selectively to rotate the supporting arm, about the pin, between a first and second operating position defining a stowed in-flight configuration and a lowered landing configuration of the landing gear respectively.

13 Claims, 9 Drawing Sheets

(56) References Cited

U.S. PATENT DOCUMENTS

| | | | |
|---|---|---|---|
| 7,575,193 B2* | 8/2009 | Payen et al. | 244/102 R |
| 7,578,465 B2* | 8/2009 | Bachmeyer et al. | 244/102 R |
| 7,621,481 B2* | 11/2009 | Hershberger et al. | 244/102 A |
| 2006/0163426 A1* | 7/2006 | Smith, III | 244/102 R |
| 2009/0095839 A1* | 4/2009 | Lassus et al. | 244/102 R |
| 2009/0250552 A1* | 10/2009 | Kearns et al. | 244/102 A |
| 2010/0181422 A1* | 7/2010 | Thompson et al. | 244/102 A |
| 2010/0243797 A1* | 9/2010 | McNutt | 244/102 A |

* cited by examiner

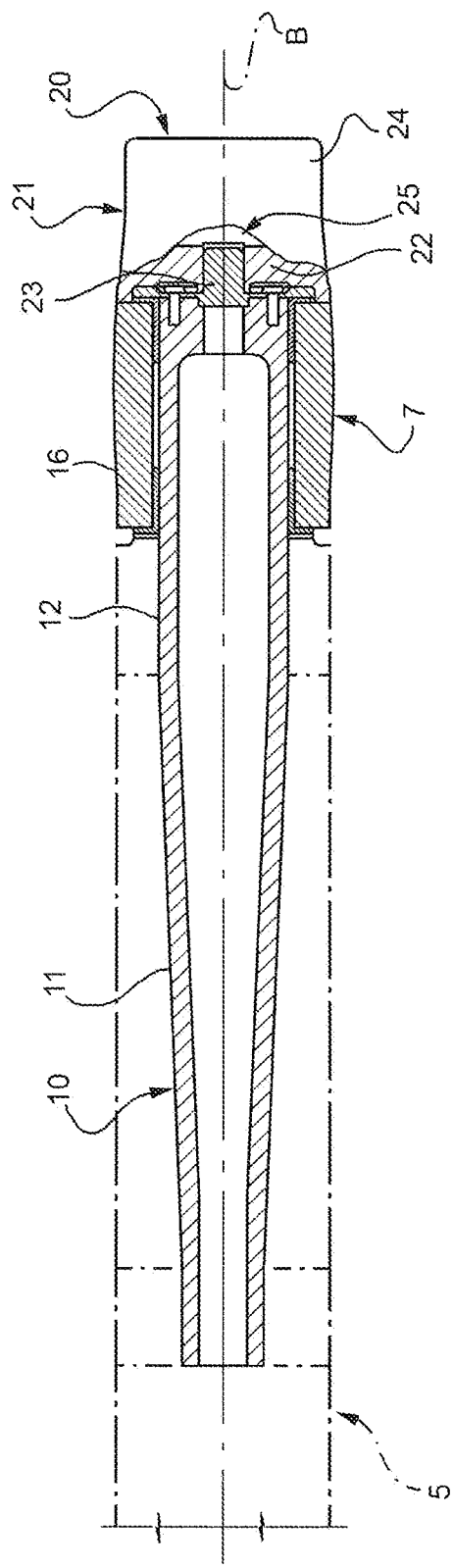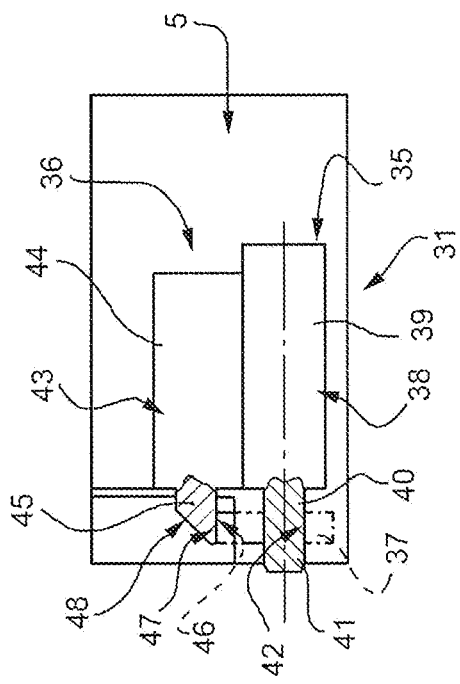

AIRCRAFT LANDING GEAR

This application claims the benefit of European Patent Application No. 09425441.4 filed Nov. 4, 2009.

The present invention relates to an aircraft landing gear, in particular a helicopter landing gear, to which the following description refers purely by way of example.

BACKGROUND OF THE INVENTION

As is known, helicopters are normally equipped with a front landing gear, and two main landing gears fixed to either side of the fuselage. Landing gears perform the vital function of absorbing shock and cushioning the downward energy of the helicopter as it lands, so, depending on the application for which they are designed, come in widely differing types.

For example, fixed landing gears are known comprising a supporting lever mechanism secured to the fuselage, and to which one or more wheels are suspended; and a shock absorber secured at one end to, the wheel and at the other end to a respective side of the fuselage to absorb the downward energy of the helicopter. More specifically, the supporting lever mechanism, which often comprises one arm hinged to the supporting structure of the helicopter, keeps the wheel a given distance from the underside of the fuselage, and, when landing, allows vertical travel of the wheel under control of the shock absorber.

Landing gears of this sort may be designed to severe crash landing specifications, and are therefore particularly suitable for military use.

Crash landing specifications are less strict for civil than for military helicopters, which means civil helicopters can be equipped with either fixed or retractable landing gears, i.e. which, in flight, can be set to a stowed or withdrawn configuration, in which the wheels are substantially housed within the helicopter to reduce drag and fuel consumption.

More specifically, the lever mechanisms supporting the wheels are normally designed to rotate the wheels vertically in and out of wheel compartments in the fuselage, and possibly also perpendicularly into a horizontal position.

More specifically, retractable landing gears normally comprise a housing which is fixed to and projects from the fuselage, is fitted with the supporting lever mechanism to which the wheel is suspended, and defines the compartment for housing the wheel in the stowed configuration.

The movement of each landing gear between the stowed and a lowered landing configuration is normally controlled by a system comprising a hydraulic jack powered by a dedicated circuit.

Assembling the control systems to helicopters calls for structural supports and space in which to fix the hydraulic jacks and house the jack feed lines.

At present, converting fixed to retractable landing gears is therefore a major undertaking that involves grounding the helicopter for several months to carry out the necessary structural alterations and regulation testing.

SUMMARY OF THE INVENTION

It is an object of the present invention to provide an aircraft landing gear that is straightforward in design and at the same time safe and reliable.

According to the present invention, there is provided a landing gear for an aircraft, as claimed in the attached claims.

Another object of the present invention is to provide an aircraft landing gear that can be converted easily from fixed to retractable, and vice versa.

According to the present invention, there is provided a landing gear for an aircraft, as claimed in the attached claims.

BRIEF DESCRIPTION OF THE DRAWINGS

A number of preferred, non-limiting embodiments of the present invention will be described by way of example with reference to the accompanying drawings, in which:

FIG. 5 shows a larger-scale section along line V-V in FIG. 3;

FIG. 6 shows a larger-scale section along line VI-VI in FIG. 3;

DETAILED DESCRIPTION OF THE INVENTION

Figure 1:
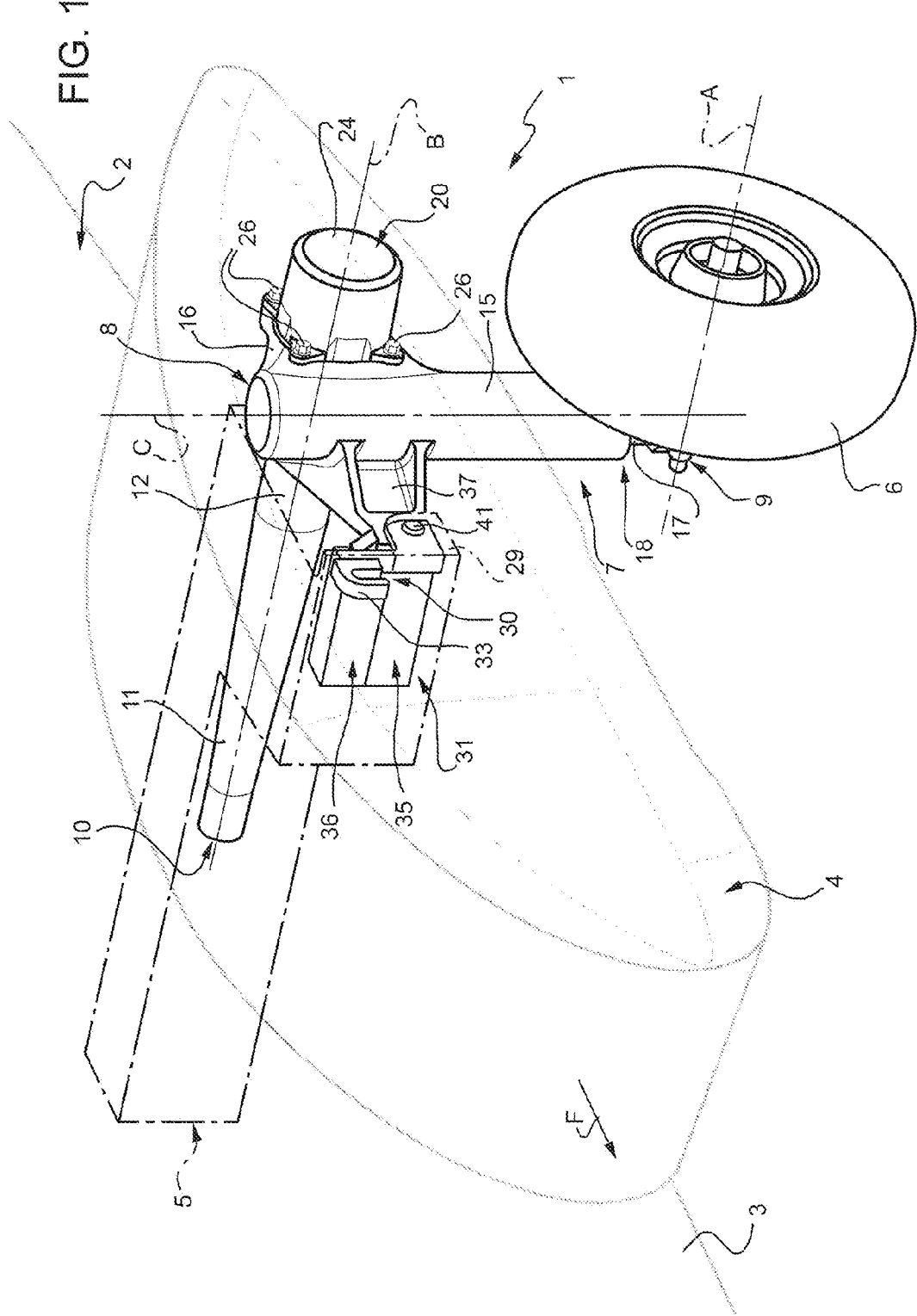
FIG. 1 shows a first view in perspective of a retractable main landing gear, in accordance with the present invention, fitted to a helicopter fuselage and in a landing configuration.
Figure 2:
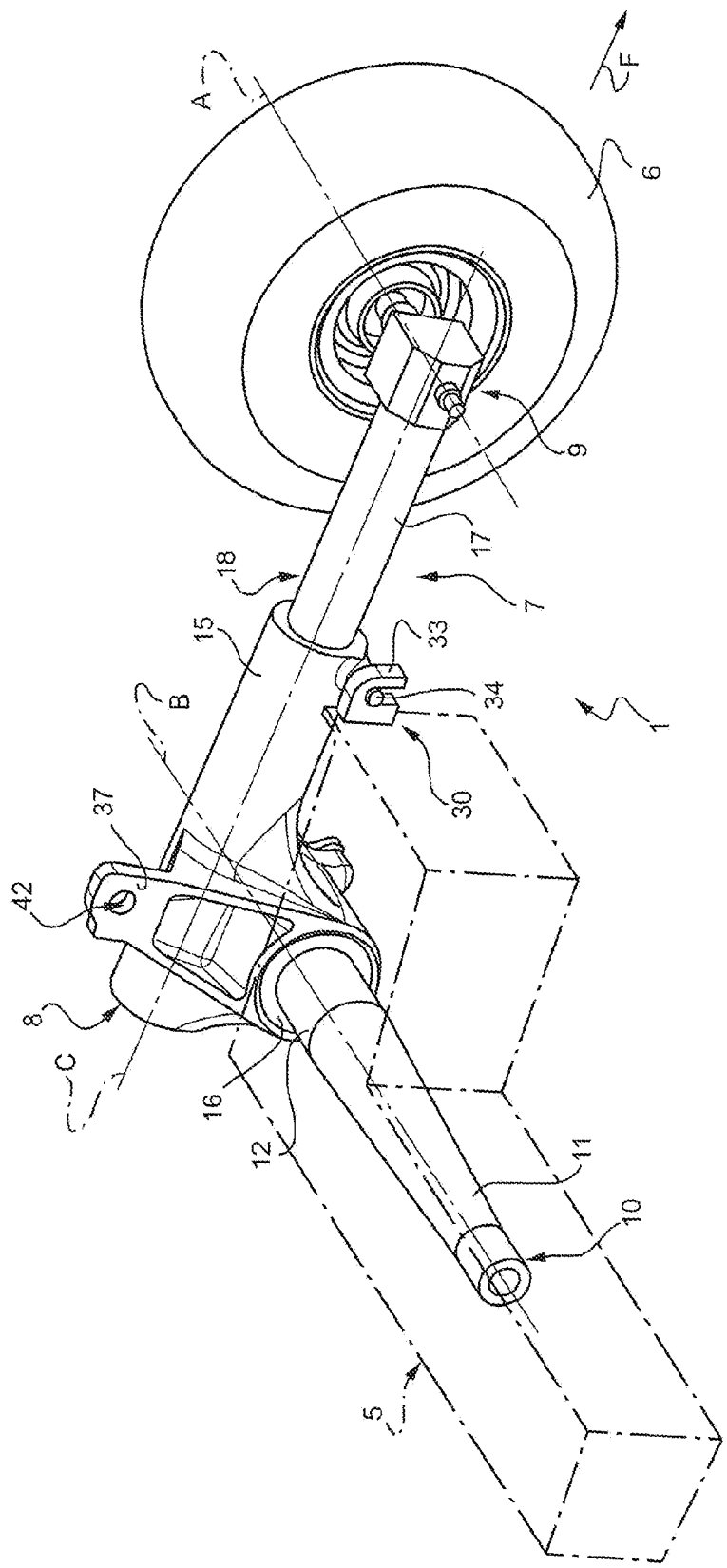
FIG. 2 shows a second view in perspective of the FIG. 1 landing gear in a stowed in-flight configuration.
Figure 3:
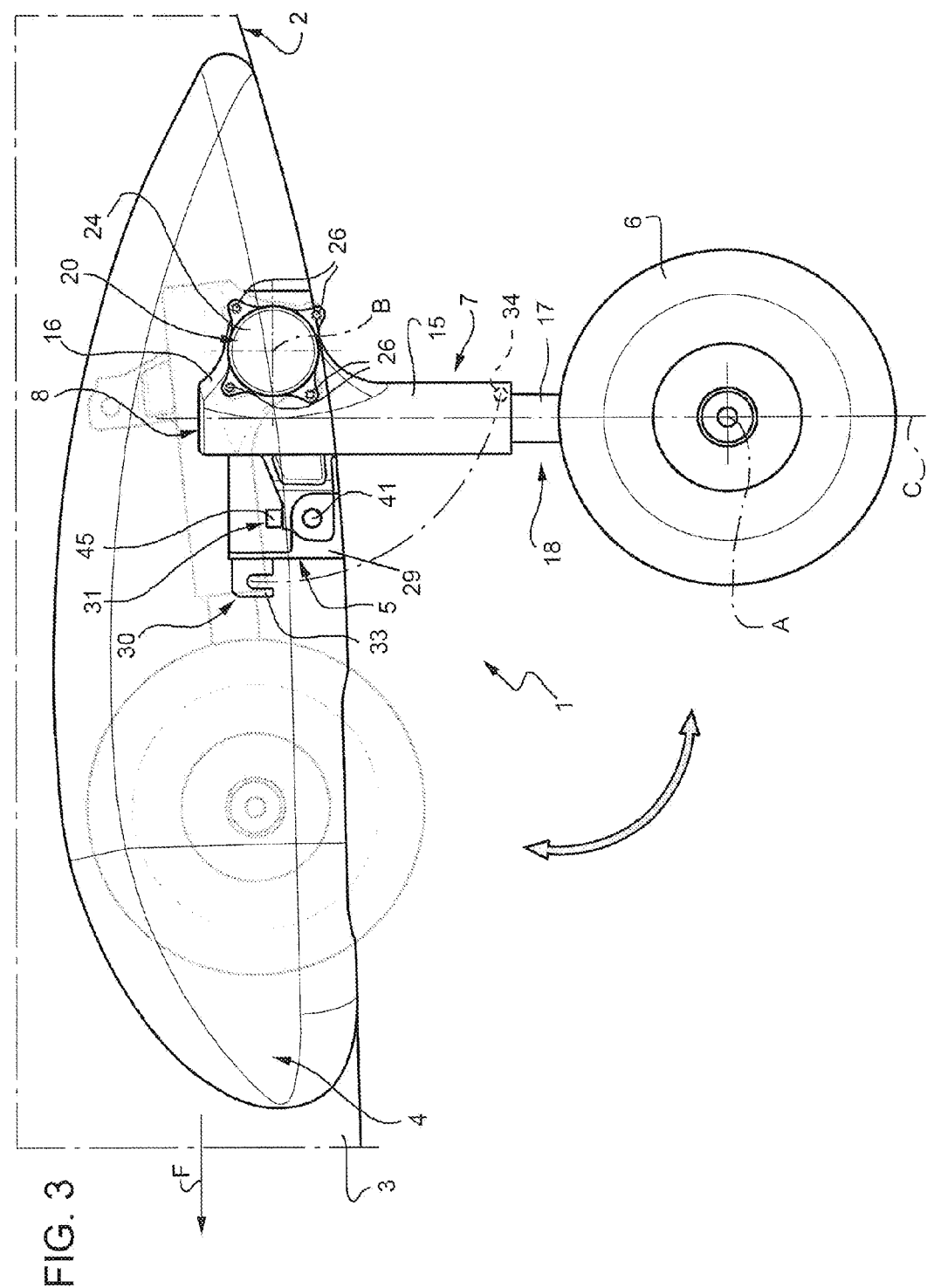
FIG. 3 shows a side view of the FIG. 1 landing gear in the landing configuration and stowed in-flight configuration.
Figure 4:
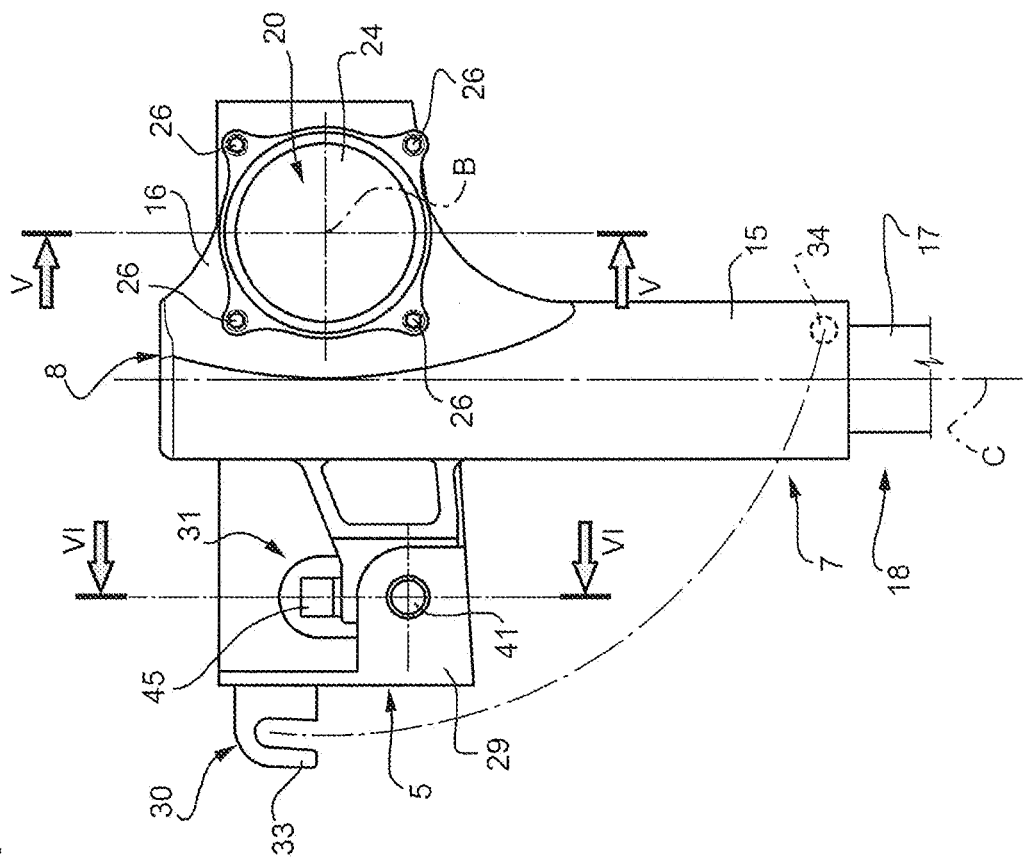
FIG. 4 shows a larger-scale side view of a portion of the FIG. 1 landing gear.

Number 1 in FIGS. 1 to 3 indicates as a whole a retractable main landing gear of a helicopter 2.

Being known, only the component parts of helicopter 2 pertinent to the present invention are shown in the attached drawings, and namely: a fuselage 3 defining, along each side, a bottom seat 4 for receiving a respective landing gear 1.

Since helicopter 2 is equipped, as is normally the case, with two identical main landing gears on either side of fuselage 3, only one main landing gear and the part of fuselage 3 supporting it will be described for the sake of simplicity.

As shown in FIGS. 1 to 3, landing gear 1 substantially comprises a mount 5 (only shown schematically) fitted rigidly inside respective seat 4 in fuselage 3; a wheel 6 having an axis A crosswise to the longitudinal flying direction F of helicopter 2; and a supporting arm 7 having an end portion 8 secured to mount 5, and an opposite end portion 9 to which wheel 6 is suspended.

In the example shown, mount 5 has a box structure elongated crosswise to flying direction F of helicopter 2, and is fitted on the outside with projecting supporting arm 7.

More specifically, end portion 8 of supporting arm 7 is hinged about a pin 10 (FIGS. 1, 2, 5) which has an axis B parallel to axis A and crosswise to arm 7, and extends through and is fixed to mount 5.

More specifically, pin 10 has a truncated-cone-shaped portion 11 fitted rigidly inside mount 5; and a cylindrical portion 12 (FIGS. 1, 2, 5) projecting outwards of mount 5 and connected to end portion 8 of supporting arm 7.

More specifically, supporting arm 7 is substantially cylindrical, with an axis C perpendicular to axes A and B, along its shaft 15, and is cylindrical and coaxial with axis B at a portion 16 of end portion 8 projecting laterally from shaft 15.

In other words, pin 10 and axis C of shaft 15 are spaced apart.

In the example shown, shaft 15 is engaged in axially-sliding manner by a piston 17 to define a shock-absorber 18. More specifically, the axial end of shaft 15 adjacent to mount 5 forms part of end portion 8 of supporting arm 7, and piston 17 projects outwards from the opposite end of shaft 15 to define the whole of end portion 9 supporting wheel 6.

Portion 16 of supporting arm 7 is advantageously mounted to rotate on cylindrical portion 12 of pin 10, and is fitted with an electrically controlled actuator 20 activated selectively to rotate supporting arm 7, about pin 10, between a first and second operating position respectively defining a stowed or raised in-flight configuration (FIG. 2 and phantom portion of FIG. 3) and a lowered landing configuration (FIG. 1 and bold portion of FIG. 3) of landing gear 1.

In the example shown, actuator 20 projects, coaxially with pin 10, from portion 16 of supporting arm 7.

Actuator 20 preferably comprises an electric motor 21 having a stator 22 connected angularly to and projecting from cylindrical portion 12 of pin 10 by means of a key 23, and a more radially outer rotor 24 fixed rigidly to and projecting from portion 16 of supporting arm 7, on the opposite side to that facing mount 5.

More specifically, rotor 24 defines the casing of motor 21, has an inner seat 25 housing stator 22 (FIG. 5), and, in the example shown, is substantially cup-shaped, with the open side fixed to the front of portion 16 of supporting arm 7 by screws 26.

As shown in FIG. 2 and the phantom portion of FIG. 3, when landing gear 1 is in the stowed in-flight configuration, supporting arm 7 is housed inside seat 4 in fuselage 3, extends substantially parallel to the flying direction F of helicopter 2, and is practically horizontal with reference to the grounded position of helicopter 2; whereas, when landing gear 1 is in the lowered landing configuration (FIGS. 1, 3), supporting arm 7 is extracted from seat 4 in fuselage 3, extends crosswise to axes A and B and flying direction F of helicopter 2, and is practically vertical with reference to the grounded position of helicopter 2.

The stowed and lowered configurations are locked by respective releasable locking means 30, 31 fitted to mount 5 on the opposite side of supporting arm 7 to pin 10.

More specifically, locking means 30 are activated by an electric command to retain supporting arm 7 in the first operating position, and are released when there is no electric command.

More specifically, locking means 30 comprise a retaining member 33 fixed inside seat 4 in fuselage 3 and in the form of an inverted U, i.e. with its cavity facing downwards when helicopter 2 is grounded; and a peg 34 projecting from shaft 15 of supporting arm 7, adjacent to end portion 9, and which engages the cavity of retaining member 33 when landing gear 1 is in the stowed configuration.

The electric command for locking peg 34 inside retaining member 33 is preferably defined by operation of motor 21, which is therefore kept running to continually push supporting arm 7 into the first operating position, and so push peg 34 against the top of retaining member 33.

In the event of electrical failure, this solution allows landing gear 1, when not operated by motor 21, to drop by gravity into the lowered landing configuration.

Alternatively, peg 34 may be locked in place by a stop member (not shown), which is activated electrically to close the bottom of the cavity of retaining member 33 and prevent release of peg 34, and is released by elastic means to free peg 34 in the event of electrical failure.

Locking means 31 comprise a main locking device 35 and an auxiliary safety locking device 36, both of which act on a contoured flange 37 projecting from the diametrically opposite side of shaft 15 of supporting arm 7 with respect to portion 16.

More specifically, locking device 35 comprises an electrically controlled actuator 38 having an outer casing 39 fixed to mount 5, and a movable member 40 movable, with respect to casing 39 and in a direction parallel to axes A and B, between a lock position (FIGS. 1, 3, 4, 6) and a release position. In the lock position, a cylindrical end portion 41 of movable member 40 projects axially from casing 39 to engage a through hole 42 in flange 37, and a through hole in a flange 29 integral with mount 5 and parallel to flange 37. That is, in the lock position, flange 37 is interposed between casing 39 of actuator 38 and the fixed flange 29.

Conversely, in the release position, end portion 41 of movable member 40 is detached from flange 37.

Locking device 36, on the other hand, is clicked into place by supporting arm 7 moving into the second operating position, and prevents release of supporting arm 7 from the second operating position.

More specifically, locking device 36 comprises an electrically controlled actuator 43 having an outer casing 44 fixed to mount 5, above casing 39 of locking device 35, and a latch 45 loaded elastically into a lock position (FIGS. 1, 3, 4, 6) in which it projects axially from casing 44 and cooperates with an edge 46 of flange 37, located on top in the lowered landing configuration of landing gear 1, to prevent supporting arm 7 from rotating into the first operating position, and so prevent landing gear 1 from rotating into the stowed configuration. Latch 45 can be released from the lock position into a release position, in which it disengages flange 37, by an electric command capable of overcoming the elastic force exerted on latch 45.

With reference to the landing position of helicopter 2, latch 45 is bounded at the bottom by a horizontal retaining side 47, and at the top by a downward-sloping ramp side 48, so that, in the event of electrical failure, ramp side 48 allows supporting arm 7 to drop from the first to the second operating position, and horizontal side 47 acts on the top edge 46 of flange 37 to prevent supporting arm 7 from moving back up.

Landing gear 1 thus constitutes a pre-assembled assembly that can be fixed inside seat 4 in fuselage 3.

In actual use, landing gear 1 is moved from the lowered configuration (FIGS. 1, 4 and bold portion of FIG. 3) to the stowed configuration (FIG. 2 and phantom portion of FIG. 3) as described below, by movable member 40 of actuator 38 and latch 45 of actuator 43 moving into their respective release positions, and by operating motor 21 to rotate supporting arm 7 clockwise, in FIGS. 1 to 3, about pin 10.

More specifically, when actuators 38 and 43 are activated, cylindrical portion 41 of movable member 40 withdraws inside casing 39 to disengage hole 42 in flange 37; and, in exactly the same way, latch 45 withdraws inside casing 44 to release edge 46 of flange 37.

At this point, operation of motor 21 rotates outer rotor 24 with respect to stator 22, thus rotating supporting arm 7 about pin 10 until peg 34 on shaft 15 of supporting arm 7 engages the cavity in retaining member 33. As long as motor 21 is kept running, landing gear 1 remains locked in the stowed configuration.

To move back into the lowered landing configuration, supporting arm 7 is rotated in the opposite direction about pin 10, and movable member 40 of actuator 38 and latch 45 of actuator 43 are moved into their respective lock positions.

It is important to note that, in the event of electrical failure, landing gear 1 returns automatically into the lowered landing configuration by force of gravity. That is, when motor 21 is deactivated, peg 34 is free to disengage retaining member 33 and so allow supporting arm 7 to move back into the second operating position. As it does so, downward-sloping ramp side 48 of latch 45, pushed elastically outwards of casing 44, permits rotation of supporting arm 7. More specifically, flange 37 contacts sloping side 48 of latch 45, to force latch 45 back into casing 44 in opposition to the elastic force tending to push it outwards; and, once flange 37 gets past latch 45, this clicks elastically into the lock position in which horizontal side 47 defines a stop surface for the top edge 46 of flange 37, thus locking supporting arm 7 in the second operating position.

Figure 7:
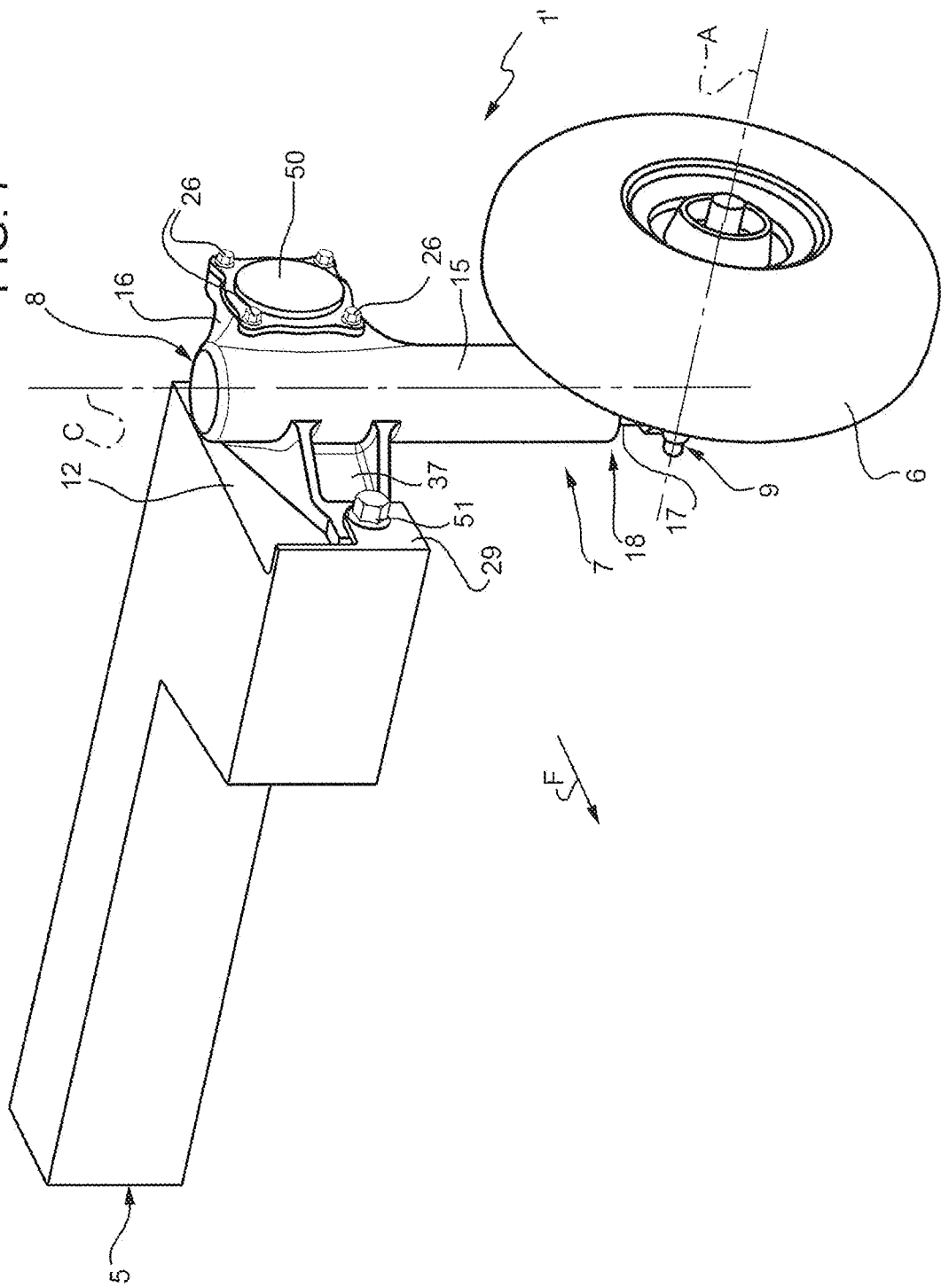
FIG. 7 shows a view in perspective of a fixed main helicopter landing gear in accordance with the teachings of the present invention.

Number 1' in FIG. 7 indicates as a whole a fixed main landing gear of helicopter 2, in accordance with the teachings of the present invention, and the component parts of which are indicated, where possible, using the same reference numbers as for corresponding or equivalent parts of landing gear 1.

More specifically, landing gear 1' can be formed from landing gear 1 by simply replacing motor 21 with a cover 50 fixed to portion 16 of supporting arm 7 by screws 26, and by securing flange 37 to mount 5 by a screw 51 inside hole 42.

At this point, actuators 38 and 43 and retaining member 33 may be removed.

The switch between the two fixed landing gear 1' and retractable landing gear 1 solutions is obviously made using the same connecting points, i.e. the holes in portion 16 for screws 26, and hole 42 in flange 37 for receiving screw 51 or cylindrical portion 41 of movable member 40 in the lock position.

In this case, too, landing gear 1' constitutes a pre-assembled assembly that can be fixed inside seat 4 in fuselage 3.

Figure 8:
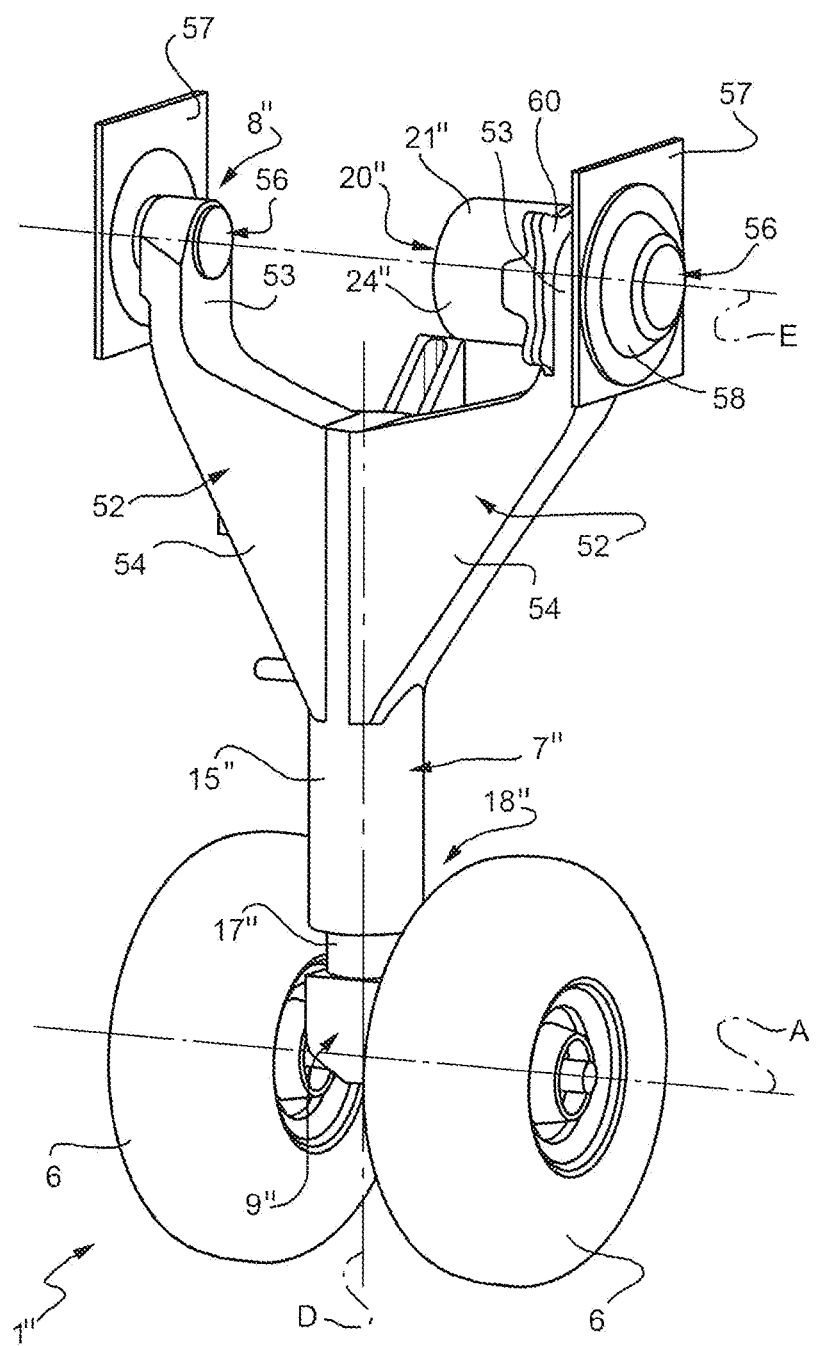
FIG. 8 shows a view in perspective of a retractable front helicopter landing gear in accordance with the teachings of the present invention and in a landing configuration.
Figure 9:
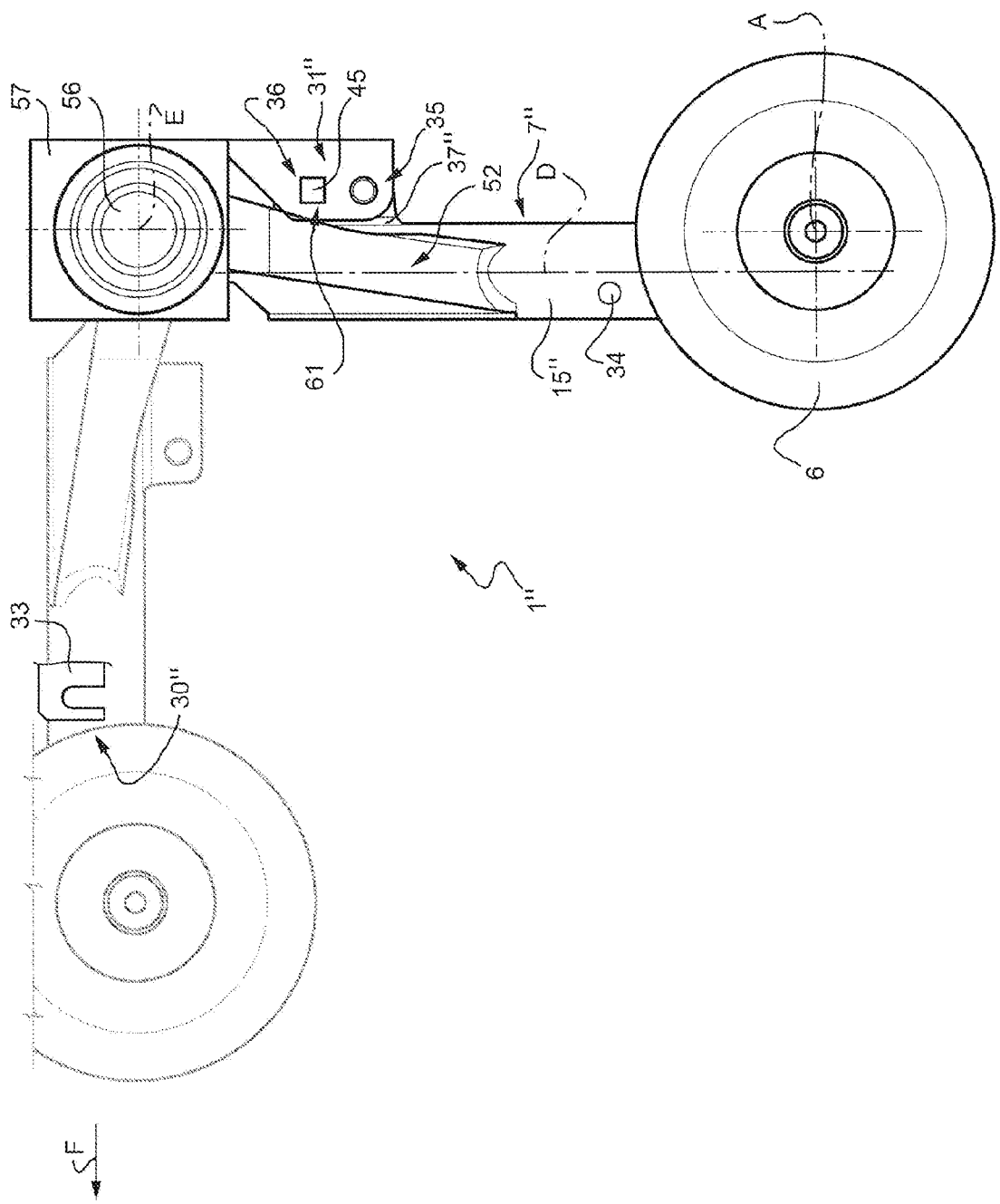
FIG. 9 shows a side view of the FIG. 8 landing gear in the landing configuration and stowed in-flight configuration.

Number 1" in FIGS. 8 and 9 indicates as a whole a retractable front landing gear of helicopter 2, in accordance with the present invention, and the component parts of which are indicated, where possible, using the same reference numbers as for corresponding or equivalent parts of landing gear 1.

Landing gear 1" substantially differs from landing gear 1 by comprising a supporting arm 7" which fits to two separate parts of a front portion of fuselage 3, and to which two side by side wheels 6 are suspended.

More specifically, with reference to the grounded position of helicopter 2 (FIG. 8), supporting arm 7" comprises a cylindrical shaft 15" identical to shaft 15 of landing gear 1 and having an axis D parallel to axis C; and two side flanges 52 projecting from diametrically-opposite sides of a top portion of shaft 15", and having respective top ends 53 hinged to fuselage 3 along the same axis E parallel to axes A and B.

More specifically, each flange 52 comprises a main portion 54, substantially in the form of a right triangle with one cathetus at the top, and the other cathetus positioned vertically and fixed to shaft 15"; and a lug, which projects upwards from a top vertex between the hypotenuse and top cathetus of the right triangle, and defines end 53 hinged to fuselage 3.

As shown in FIG. 8, the top ends 53 of flanges 52 together define a first end portion 8" of supporting arm 7", and are hinged about respective pins 56, of axis E, fixed rigidly to fuselage 3 by respective vertical mounting plates 57.

Each pin 56 has a cylindrical portion (not shown in FIGS. 8 and 9) engaging a through hole (not shown) in top end 53 of relative flange 52; and a truncated-cone-shaped portion 58, which projects from the opposite side of top end 53 to that facing top end 53 of the other flange 52, and is secured rigidly to relative mounting plate 57, in turn fixed to fuselage 3.

Top ends 53 of flanges 52 are advantageously mounted to rotate about respective pins 56, and one of them is connected to an electrically controlled actuator 20" identical to actuator 20 of landing gear 1.

As before, actuator 20" is activated selectively to rotate supporting arm 7", about pins 56 and axis E, between a first and second operating position respectively defining a stowed or raised in-flight configuration (phantom portion of FIG. 9) or a lowered landing configuration (FIG. 8 and bold portion of FIG. 9) of landing gear 1".

Actuator 20" is preferably defined by an electric motor 21" having a stator (not shown in FIGS. 8 and 9) fixed to relative pin 56 and mounting plate 57; and a more radially outer rotor 24" projecting from and fixed rigidly by screws (not shown) to a platelike seating portion 60 of end 53, on the opposite side to mounting plate 57.

In this case, too, rotor 24" defines the casing of electric motor 21".

As shown in the phantom portion of FIG. 9, when landing gear 1" is in the stowed in-flight configuration, supporting arm 7" extends substantially parallel to the flying direction F of helicopter 2, and is practically horizontal with reference to the grounded position of helicopter 2; whereas, when landing gear 1" is in the lowered landing configuration (FIG. 8 and bold portion of FIG. 9), supporting arm 7" extends crosswise to axes A and B and the flying direction F of helicopter 2, and is practically vertical with reference to the grounded position of helicopter 2.

In this case, too, the stowed and lowered configurations are locked by respective releasable locking means 30" and 31" fitted to one or both of mounting plates 57 or directly to fuselage 3, and which act on a flange 37" projecting from one side of shaft 15".

Locking means 30", 31" are identical to locking means 30, 31, and therefore not described, except to state that, in this case, latch 45 of auxiliary locking device 36 of locking means 31" engages a through opening 61 in flange 37", as opposed to cooperating with its top edge.

As for landing gear 1, shaft 15" is engaged in axially-sliding manner by a piston 17" to define a shock-absorber 18"; and the free end of piston 17" defines an end portion 9" of supporting arm 7", opposite end portion 8" and to which the two wheels 6 are suspended.

Operation of landing gear 1" is identical to that of landing gear 1 and therefore not described for the sake of simplicity.

Figure 10:
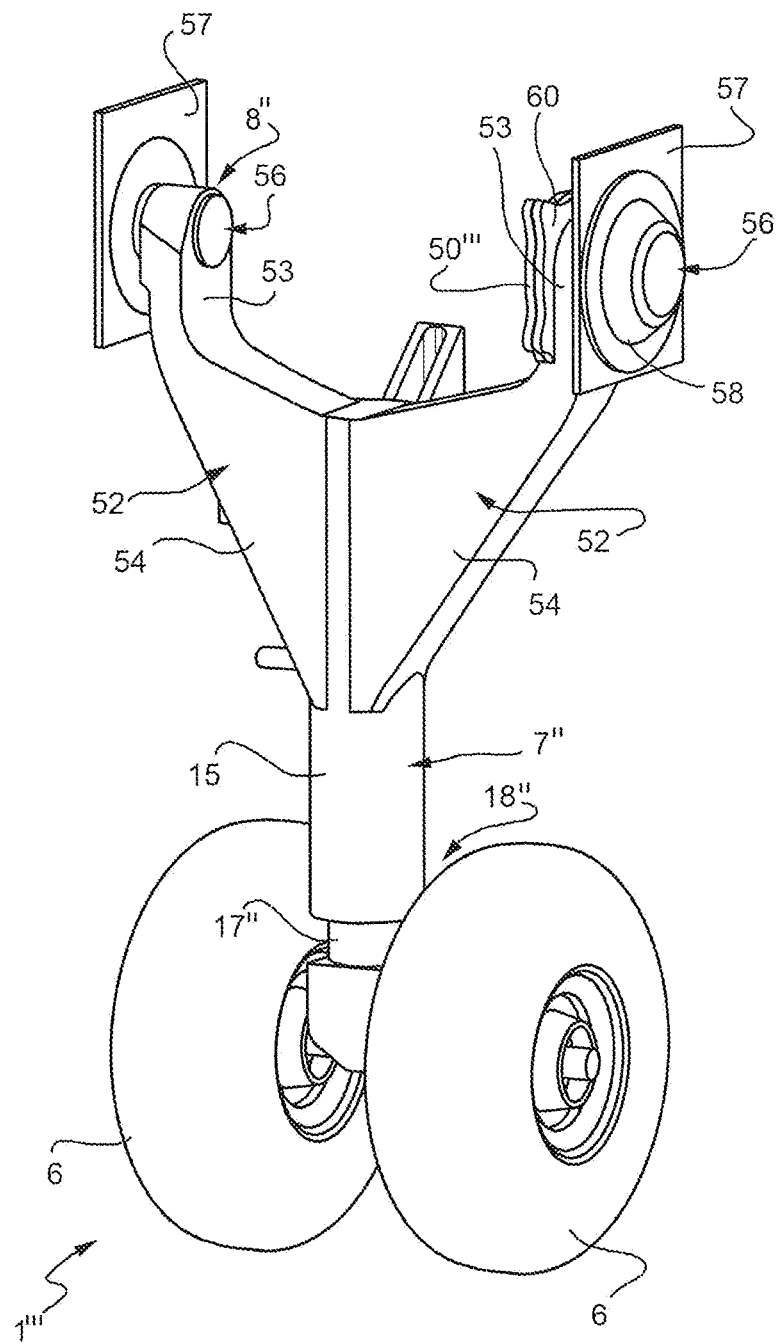
FIG. 10 shows a view in perspective of a fixed front helicopter landing gear in accordance with the teachings of the present invention.

Number 1''' in FIG. 10 indicates as a whole a fixed front landing gear of helicopter 2, in accordance with the teachings of the present invention, and the component parts of which are indicated, where possible, using the same reference numbers as for corresponding or equivalent parts of landing gear 1".

More specifically, landing gear 1''' can be formed from landing gear 1" by simply replacing motor 21" with a cover 50''' fixed to seating portion 60 of supporting arm 7" by screws 26, and by securing flange 37" to relative mounting plate 57 or directly to fuselage 3 by a screw inside the hole for movable member 40 of locking device 35.

At this point, actuators 38 and 43 and retaining member 33 may be removed.

In this case, too, the switch between the two fixed landing gear 1''' and retractable landing gear 1" solutions is obviously made using the same connecting points, i.e. the screw holes in seating portion 60 to fasten actuator 20", and the hole in flange 37" for receiving cylindrical portion 41 of movable member 40 of locking device 35.

Landing gears 1" and 1''' therefore also constitute pre-assembled assemblies that can be fixed to fuselage 3.

The advantages of landing gears 1, 1', 1" and 1''' according to the present invention will be clear from the above description.

In particular, retractable landing gears 1 and 1" described are extremely straightforward in design and substantially defined by one supporting arm 7, 7" supporting wheel/s 6 and activated by an electrically controlled actuator 20, 20" fitted to the outside of and projecting from supporting arm 7, 7".

This solution provides, on the one hand, for minimizing the number of component parts of retractable landing gear 1, 1", and, on the other, for reducing the power system of actuator 20, 20" to a number of electric cables and connectors that can be housed in very little space on helicopter 2, with no structural supports required.

The design proposed also provides for easy conversion of fixed landing gears 1', 1''' to respective retractable landing gears 1, 1" by simply replacing covers 50, 50''' with actuators 20, 20" and electric wiring.

Moreover, conversion of fixed landing gears 1', 1''' to retractable landing gears 1, 1" involves no work on the hydraulic circuits of helicopter 2, and therefore no regulation testing, so can be carried out in a few days, thus minimizing the time helicopter 2 is grounded.

Clearly, changes may be made to landing gears 1, 1', 1" and 1''' as described and illustrated herein without, however, departing from the protective scope defined in the accompanying Claims.

The invention claimed is:

1. A landing gear for an aircraft, comprising:
    mounting means fitted to the fuselage of the aircraft;
    at least one wheel; and
    at least one supporting arm having a first end portion connected to said mounting means, and a second end portion opposite said first end portion, and to which said wheel is suspended;
    wherein said first end portion of said supporting arm comprises a seating portion fitted in rotary manner to a pin connected to said mounting means and extending crosswise to the supporting arm; and
    wherein an electrically controlled actuator is fitted to said seating portion, and is activated selectively to rotate said supporting arm, about said pin, between a first and second operating position defining a stowed in-flight configuration and a lowered landing configuration of the landing gear respectively;
    characterized in that said actuator projects, coaxially with said pin, from said seating portion of said supporting arm.

2. A landing gear as claimed in claim 1, characterized in that said actuator comprises a stator fitted to said pin; and a rotor radially more outwards than said stator and fixed to and projecting from said seating portion of said supporting arm.

3. A landing gear as claimed in claim 2, characterized in that said rotor defines a seat for housing said stator.

4. A landing gear as claimed in claim 1, characterized in that said supporting arm defines a shock-absorber comprising a cylindrical shaft, and a piston connected in axially-sliding manner to said shaft.

5. A landing gear as claimed in claim 4, characterized in that said shaft carries said first end portion of said supporting arm; and a portion of said piston projecting from said shaft defines said second end portion.

6. A landing gear as claimed in claim 4, characterized in that said pin is spaced apart from the axis of said shaft.

7. A landing gear as claimed in claim 1, characterized by comprising first locking means activated by an electric command to retain said supporting arm in said first operating position, and which are releasable in the absence of said electric command.

8. A landing gear as claimed in claim 7, characterized in that said first locking means comprise a first retaining member fitted to the fuselage of the aircraft; and a second retaining member fitted to said supporting arm, and which engages said first retaining member when the supporting arm is in said first operating position; said first and second retaining member being designed to disengage by force of gravity in the absence of said electric command.

9. A landing gear as claimed in claim 8, characterized in that said first retaining member is U-shaped with its concavity facing downwards with reference to the grounded position of the aircraft; and in that said second retaining member comprises a projection on said supporting arm and which fits inside said first retaining member.

10. A landing gear as claimed in claim 7, characterized in that said electric command is activation of said actuator.

11. A landing gear as claimed in claim 1, characterized by comprising second locking means, which are clicked into place by movement of said supporting arm into said second operating position, and prevent release of the supporting arm from said second operating position.

12. A landing gear as claimed in claim 11, characterized in that said second locking means comprise a latch fitted to the fuselage of the aircraft and movable between a lock position, in which it engages a respective cooperating portion of said supporting arm, and a release position, in which it is detached from said cooperating portion; said latch being loaded elastically into said lock position, and being bounded by a ramp surface designed to allow movement of said supporting arm from said first to said second operating position, and by a retaining surface which defines a stop surface for said cooperating portion, to prevent release of said supporting arm from said second operating position.

13. A landing gear as claimed in claim 11, characterized by comprising electrically controlled third locking means for retaining said supporting arm in said second operating position.

\* \* \* \* \*